(12) United States Patent
Milicic

(10) Patent No.: US 7,543,559 B2
(45) Date of Patent: Jun. 9, 2009

(54) GEAR CRANK MECHANISM FOR ENGINE

(76) Inventor: Ivan Milicic, 1974 Side Road 18, R.R. 3, Tottenham, Ontario (CA) L0G 1W0

( * ) Notice: Subject to any disclaimer, the term of this patent is extended or adjusted under 35 U.S.C. 154(b) by 91 days.

(21) Appl. No.: 11/896,550

(22) Filed: Sep. 4, 2007

(65) Prior Publication Data
US 2008/0053398 A1 Mar. 6, 2008

Related U.S. Application Data

(60) Provisional application No. 60/842,162, filed on Sep. 5, 2006.

(51) Int. Cl.
*F02B 75/32* (2006.01)
(52) U.S. Cl. .................. 123/197.1; 123/197.4
(58) Field of Classification Search ............. 123/197.1, 123/197.4
See application file for complete search history.

(56) References Cited

U.S. PATENT DOCUMENTS

| | | |
|---|---|---|
| 541,326 A | 6/1895 | Djavakhow |
| 550,206 A | 11/1895 | Tompkins |
| 706,844 A | 8/1902 | Anonima |
| 763,742 A | 6/1904 | Emerson |
| 887,276 A | 5/1908 | Selley |
| 958,104 A | 5/1910 | Drury |
| 1,553,009 A | 9/1925 | Stuke |
| 1,754,380 A | 4/1930 | Weylandt |
| 2,287,472 A | 6/1942 | Eby |
| 2,533,046 A * | 12/1950 | Riederer .................. 74/29 |

\* cited by examiner

*Primary Examiner*—Noah Kamen

(57) ABSTRACT

A gear crank mechanism for a reciprocating engine with a cylinder, a piston and a piston rod and having a pair of crank discs for each piston, with a crank pin extending between the two crank discs, in which the crank pin moves around a circular orbit path, and in which the axis of rotation of the crank discs is offset from the centre of the orbit path so that the crank pin displaces radially outwardly and inwardly relative to the centre of the crank discs.

8 Claims, 6 Drawing Sheets

GEAR CRANK MECHANISM FOR ENGINE

This application is based on U.S. Provisional Application 60/842,162 filed Sep. 5, 2006

FIELD OF THE INVENTION

The invention relates to a gear crank mechanism for a reciprocating engine having a pair of crank discs for the pistons. The crank discs provide a variation in the radial displacement between the piston connecting rod big end bearing and the centre of rotation of the crank discs. The piston connecting rod pin and big end bearing rotate around a circular orbit path, and the crank discs rotate around centres which are offset from the centre of the orbit.

BACKGROUND OF THE INVENTION

Conventional reciprocating engines employ a crank shaft which has been known since the days of the Watt steam engine. One or more pistons which reciprocate in cylinders, are connected to a common crank shaft by means of connecting rods. The lower end bearings (big ends) of the connecting rods are rotatably connected to crank pin portions of the crank shaft. The crank pins and big ends rotate about a path, concentric with the crank shaft itself.

It is well known that the system described is inefficient in many respects. Power is usually developed on the piston, when it is at the top of its stroke. In this position, the connecting rod is aligned directly with the crank pin on the crank shaft.

The piston does not develop rotational power until the crank pin passes its top dead centre position. The maximum force is clearly developed while the crank pin is rotating through its downward stroke (power stroke), and progressively diminishes when it reaches bottom dead centre. Variations in power may also arise due to expansion of the combustion gases during downward movement of the piston.

All of this is too well known to bear repetition.

Numerous proposals and attempts have been put forward to improve the efficiency of the conventional reciprocating engine. Most of them have failed due to either excessive complexity, or excessive wear, or both.

Various examples are shown in US patents.

BRIEF SUMMARY OF THE INVENTION

The invention seeks to provide a reciprocating engine with crank discs and a crank pin for a piston connecting rod, with a connecting rod bearing and crank pin which rotate around an orbit path and drive crank discs, which rotate around centres which are offset from the centre of the orbit path. In this way the radial distance between the crank pin, and the centre of the crank discs, increases and decreases away from and towards the centre of rotation of the crank discs. The crank discs are coupled to a power drive shaft, by gears.

The two rotatable crank discs, are mounted on plates which are bolted to opposite sides of a crank case, leaving a space between them.

The crank pin is located in slots in the crank discs.

This permits the crank pin to move around a circular orbit path, while the crank discs rotate about their own axis offset from the orbit path.

The two crank discs are rotatable on plates mounted on the crank case spaced apart.

Crank disc shafts rotate in bearings in respective mounting plates.

The mounting plates are also provided with crank pin grooves defining the circular orbit path of the crank pin.

The rotatable crank discs are provided with drive gears which are coupled to drive driven gears on a power drive shaft.

The crank pin grooves define inner and outer guide surfaces, and the crank pin is provided with inner bearings riding on the inner guide surfaces, and outer bearings riding on the outer guide surfaces.

The crank discs and the slots define drive teeth, and the crank pin defines meshing pin teeth, whereby then the crank pin travels around the orbit path, the pin teeth mesh with the drive teeth.

There are two crank discs, and respective drive gears on respective crank discs.

There are two driven gears, mounted on a power drive shaft spaced axially from the axis of the discs, the driven gears meshing with respective drive gears on the crank discs.

The driven gears control the two drive gears and crank discs, and keep them together.

As the crank pin and crank discs are driven around by the piston, the power developed is transmitted through the gears to the power drive shaft, to perform useful work.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

Figure 4:
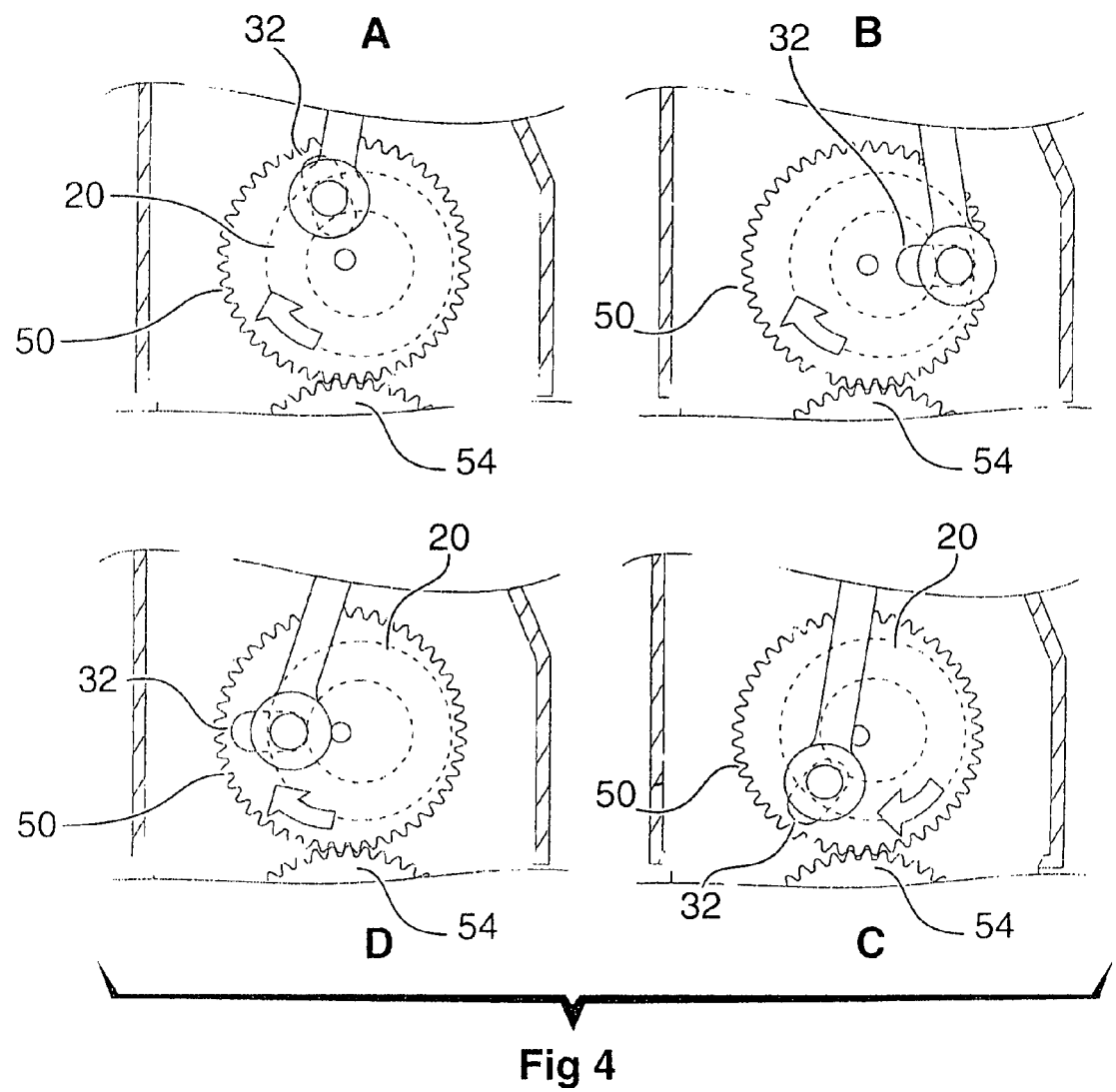
Figure 5:
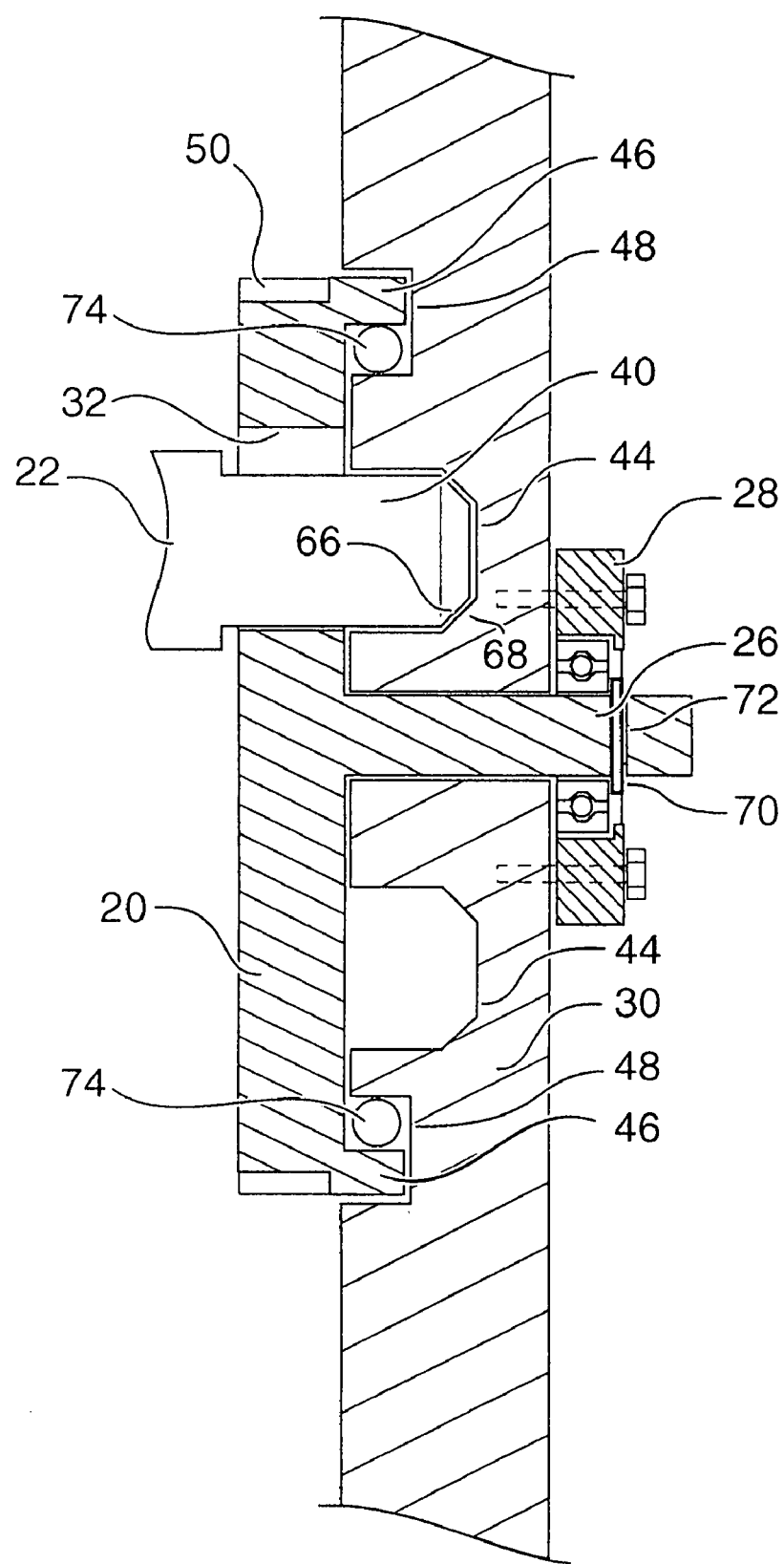
Figure 6:
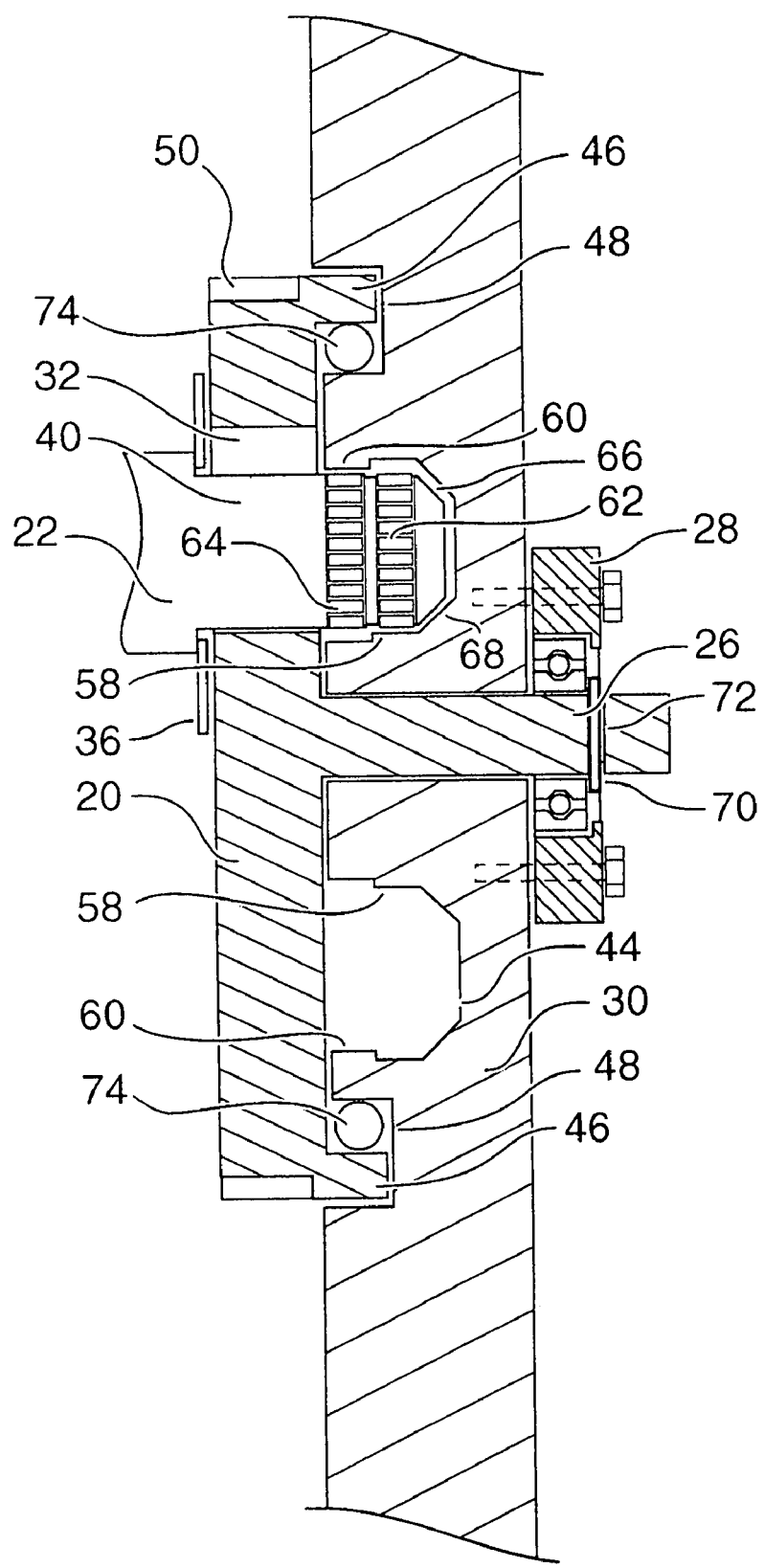

FIG. 4 A, B, C, D are respectively schematic side elevations, showing four positions of the crank during a complete cycle of revolution; and, FIG. 5 is a sectional view of one embodiment of the rotatable crank disk and crank pin and pin groove, and, FIG. 6 is a sectional view corresponding to FIG. 5, showing an alternate embodiment, with roller bearings and a pin groove with two separate guide surfaces for inner and outer roller bearings.

DESCRIPTION OF A SPECIFIC EMBODIMENT

Figure 1:
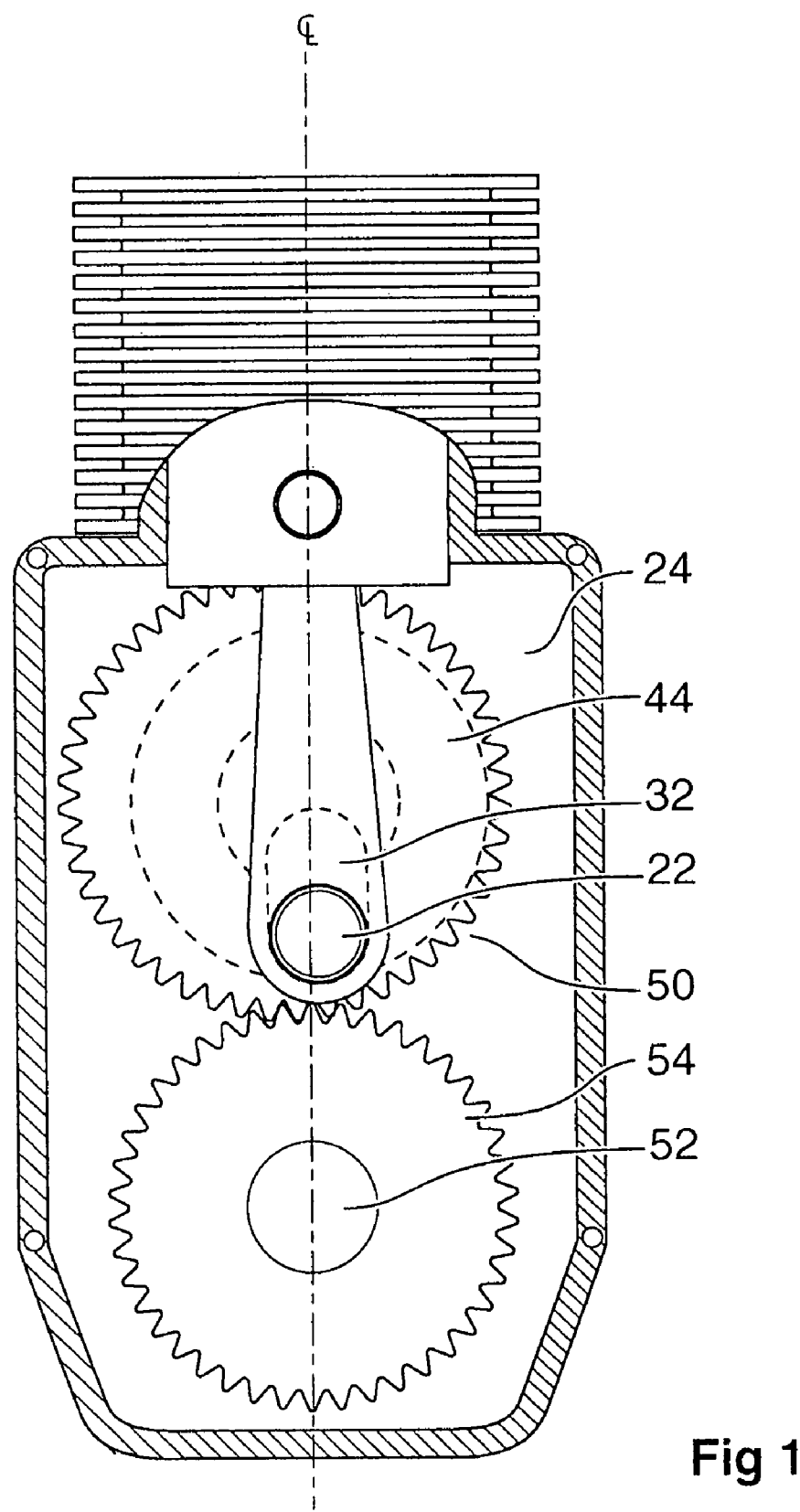
FIG. 1 is a schematic elevation of a single cylinder engine illustrating.
Figure 2:
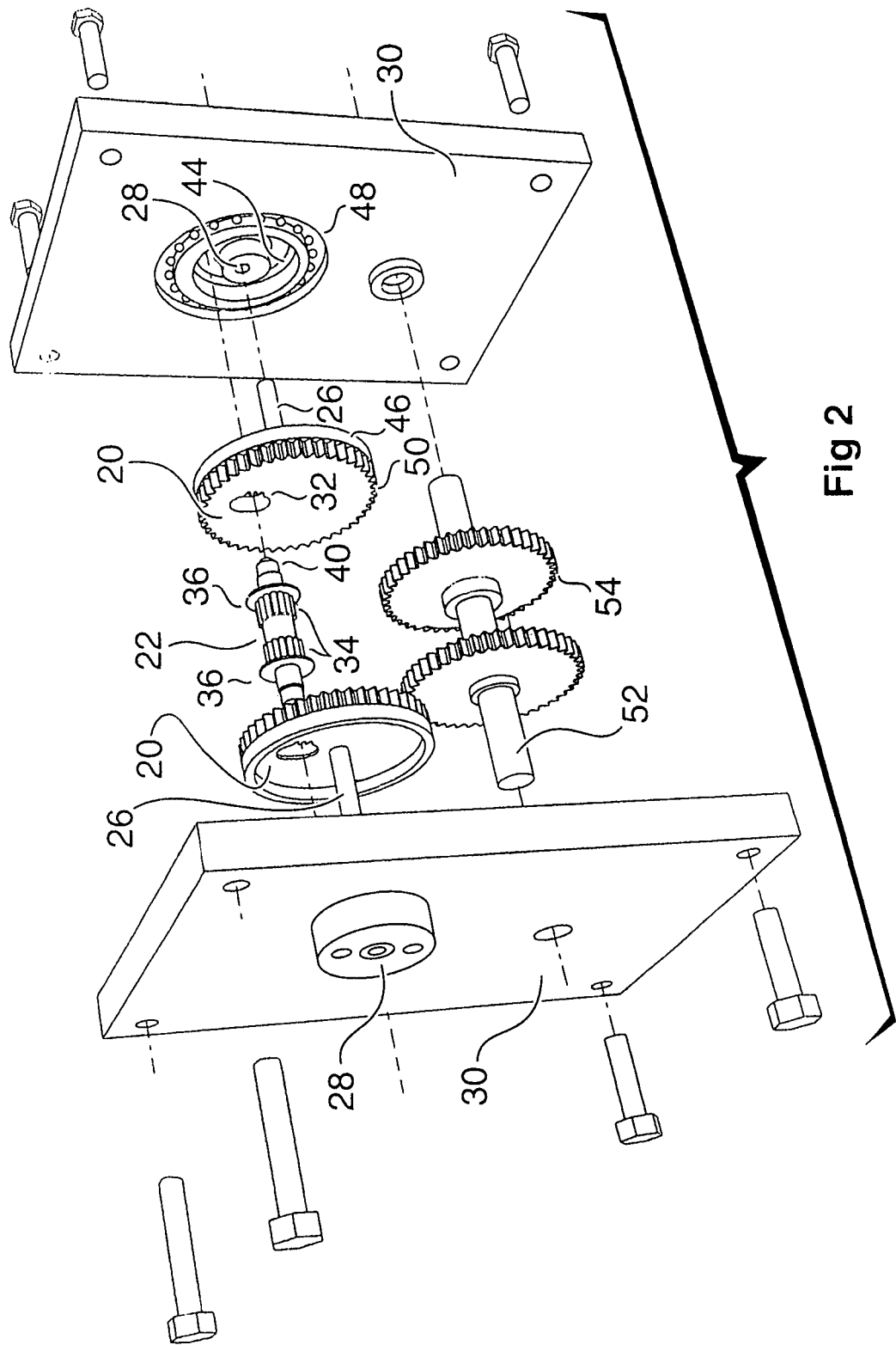
FIG. 2 is an exploded view of the crank discs, the side plates, and the crank pin, and the power shaft and gears.
Figure 3:
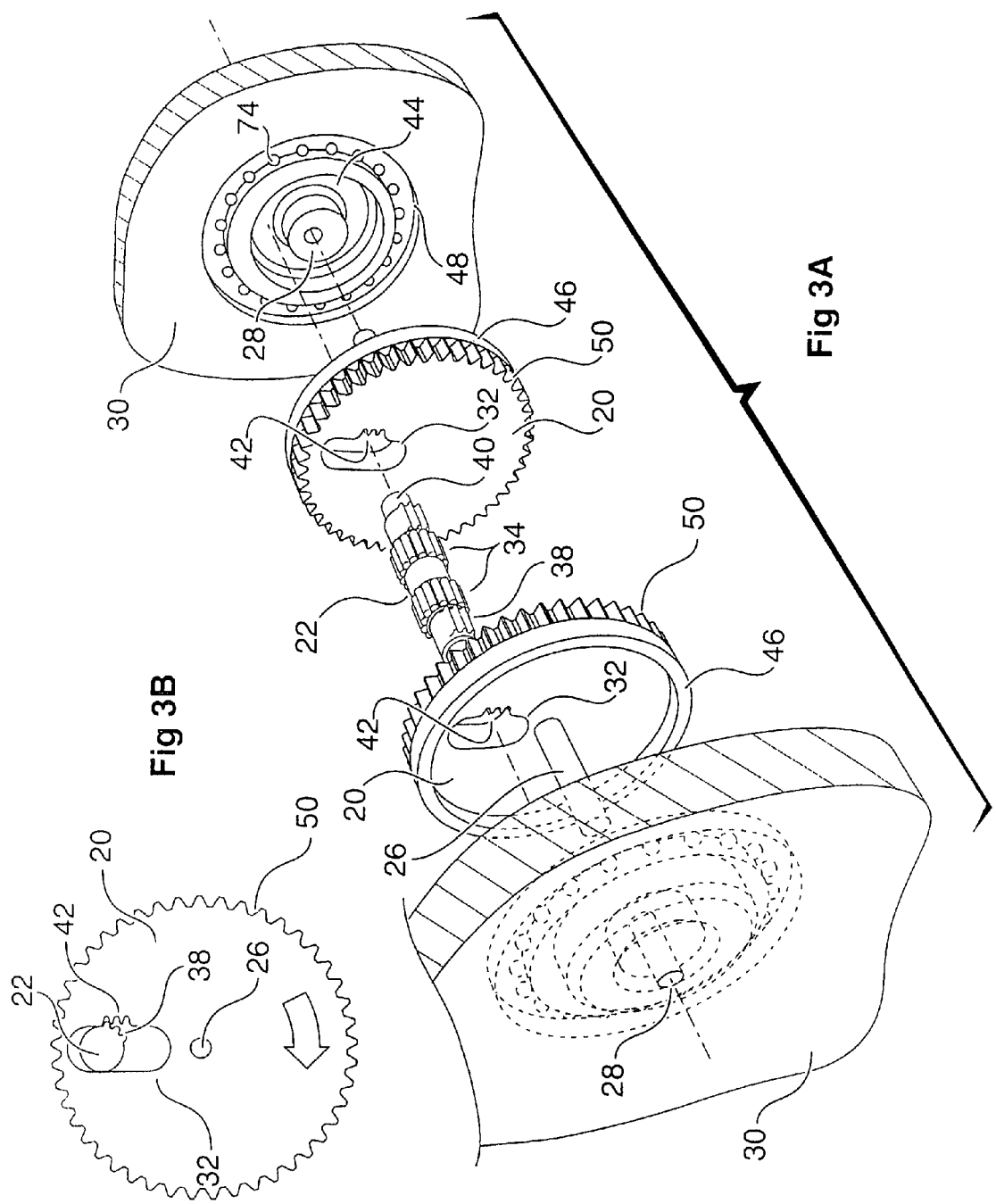
FIG. 3A is an enlarged exploded view of the crank discs and crank pin and guide grooves.
FIG. 3B is a side elevation of a crank disc and crank pin.

A single cylinder engine is illustrated in this embodiment, in FIG. 1, purely for the sake of example and without limitation. Clearly the invention could be applied to multi cylinder engines of numerous different configurations.

For the purposes of this illustration, a system applicable to a single cylinder engine is illustrated in FIG. 1.

As far as the cylinder and piston are concerned this is a typical layout for a typical single cylinder engine. The invention is not confined to such an engine but has application to many different configurations of engine whether four stroke gasoline, diesel, gas, or other power systems and fuels.

For the purposes of this invention, the remaining illustrations are confined to the actual crank discs and crank pin and drive system.

It will be seen that the invention provides two rotatable crank discs are illustrated as (20). Discs (20) are rotatably mounted on respective plates (30). Plates (30) are bolted on opposite sides of crank case (24).

The crank pin (22) is carried between the two rotatable crank discs (20). Crank discs (20) have external shafts (26) which are journalled in exterior crank disc shaft bearings (28) mounted on the exterior of side plates (30). This leaves a clear space between the two crank discs (20) free of obstruction. Each of the cranks discs (20) is formed with a generally elongated pin slot (32).

Shafts (26) are supported in bearings, and are secured by rings (70), in grooves (72)

The crank pin indicated generally as (22) is provided with big end bearings (34), and washers (36) adjacent to each end. Extending outwardly from the washers, there are, at each end, crank pin teeth (38), and a crank cam (40).

The slots (32) are formed with drive teeth (42), and the crank pin teeth (38) mesh with the drive teeth (42) in respective pin slots (32).

The crank cams (40) of crank pins (22) are received in grooves (44) formed in the side plates (30).

The grooves (44) define circular orbit paths.

Crank discs (20) rotate on axes which are offset to the axis of the orbit grooves (44) A ring (46) is formed on each of the crank disks (20), and a recess (48) is formed in each of the side plates (30). The ring (46) of each crank disc (20) is received within the respective recess (48), on the respective side plate (30). Ball bearings (74) provide wear surfaces for withstanding the forces generated.

The crank disks (20) are provided with crank gears (50).

In order to generate power, a power shaft (52) is provided spaced to one side of or below the axis of the shafts (26) of the crank disks (20).

The axis of shaft (52), in this embodiment, is aligned with the axis of orbit grooves (44), and is offset relative to the axis of crank discs (20).

Two driven gears (54) are mounted on power shaft (52), preferably in one piece.

The crank gears (50) on the crank disks (20) mesh with the driven gears (54). This then provides for transmission of rotational forces to the power shaft (52). The power shaft (52) may then be coupled to any form of drive system or gear system to perform useful work in a well known matter.

The driven gears (54) also serve to control the two crank discs (20) and keep them aligned with one another.

As shown in FIG. 5, the cams of the crank pin will simply ride in the grooves (44) formed in plates (30).

In another embodiment, (FIG. 6) the grooves are formed in two stepped portions (58) and (60). The cams of the crank pin are provided with two separate roller bearings (62) and (64). Roller bearing (62) rides on the one stepped portion (58) of the groove (44) Roller bearing (64) rides on the other stepped portion (60). The stepped portion (58) is located offset outwardly to the right (FIG. 6).

The stepped portion (60) in located offset from stepped portion (58), inwardly to the left in (FIG. 6).

This may be expressed as the portion (58) being located outwardly with respect to portion (60).

In this way, the wear of the crank pin (22) in the grooves is greatly reduced, there by extending the length of the useful life.

The crank pin is also formed with bevelled ends (66), and the groove (44), is formed with complimentary bevels (68). These cooperate to prevent the ends of the crank pin from touching the side plate.

The piston may be driven for example by any form of energy such as steam, or fossil fuel or the like, this being irrelevant for the purposes of the invention.

In Operation;

Usually this invention would be applied to a gasoline or diesel engine. In such engines the pressure commences at top dead centre, when the fuel ignites. At this point the piston rod is at top dead centre, 360 degs. Consequently, when the power applied to the piston, by the combustion, is more or less at its maximum, the piston and piston rod are at the position of least mechanical efficiency. All this is well understood.

As the piston rod and crank pin in a conventional engine, rotate towards 90 Degs, then the mechanical efficiency progressively increases. Again this is understood.

However even at 90 degs, the mechanical efficiency is dependent on the radial distance between the crank pin, and the centre of rotation of the crank shaft. This is fixed, in conventional engines.

The invention progressively extends the radial displacement between the crank pin and the centre of the crank discs. In this way, as the crank pin, and the big end of the piston rod is driven (down) by the combustion, from 360 degs towards 90 degs, the radial distance or displacement from the axis of the crank discs increases.

This results in an increase in the mechanical efficiency of conversion of energy to rotative force.

When the piston is at top dead centre, at about twelve o'clock the crank pin will be located at a point which is between the two ends of the slots.

As the piston descends, driving the crank discs (20) around, the crank pin (22) will progressively move outwardly to the outermost extremity of the slots (32).

At this point, at about 90 degrees or about three o'clock, the crank pin (22) will be at the greatest radial distance from the centre of rotation of the two rotatable crank discs. The mechanical efficiency by which the power of the piston is transmitted to the crank discs (20) will therefore increase as the radial distance between the centre of rotation of the discs (20), and the centre of rotation of the crank pin (22), increases.

As the crank pin (22) descends further, past 3 o'clock, the crank pin (22) radial displacement decreases.

At bottom dead centre, or about six o'clock, or 180 degrees, the crank pin (22) will then be more or less at the centre of slots (32) between their two ends.

As the crank pin and discs (20) continue their rotation, and the crank pin (22) displacement becomes a minimum at the 270 degree location, at about nine o'clock, the crank pin will be at about the inner most end of the slots (32), closest to its proximity to the centre of rotation of the discs (20).

Clearly it is possible to arrange a configuration with multiple cylinders all coupled to a common shaft in this way.

It is found that by the use of the invention, the increase in radial distance of the crank pin, from the centres of the crank discs, during the power stroke of the piston produces substantial increases in the power output of an engine compared with the same engine without the radial outward displacement.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A gear crank mechanism for a reciprocating engine, having a cylinder, a piston, a connecting rod, a power shaft, and comprising;

a crank pin connected to said connecting rod being moveable around a circular orbit path;

a pair of crank discs for each piston defining a centre of rotation offset from said circular orbit path;

gears connecting the crank discs to the power shaft;

elongated slots formed in said pair of crank discs, said crank pin extending between said crank discs, and said crank pin being received in said slots.

2. A gear crank mechanism for a reciprocating engine as claimed in claim 1 wherein the crank discs are spaced apart from one another and being rotatable on a common axis, and defining a clear space therebetween for reciprocation of said connecting rod, and gears on said a pair of crank discs and gears on said power shaft, said gears meshing and holding said crank discs in predetermined relation.

3. A gear crank mechanism for a reciprocating engine as claimed in claim 2, including drive teeth in said slots, and pin teeth on said crank pin interengageable with said drive gear teeth.

4. A gear crank mechanism for a reciprocating engine as claimed in claim 3 including two side plates, spaced apart on opposite sides of said crank discs, and grooves formed in said side plates for receiving said crank pin.

5. A gear crank mechanism for a reciprocating engine as claimed in claim 4 and including cams on said crank pin, said cams riding in said grooves.

6. A gear crank mechanism for a reciprocating engine as claimed in claim 5 and including rings on said crank discs, and recesses in said side plates for receiving said rings, and ball bearings in said recesses.

7. A gear crank mechanism for a reciprocating engine, having a cylinder, a piston, a connecting rod, a main driven shaft, and comprising;

a crank pin coupled to the connecting rod and being moveable around a circular orbit path;

two rotatable crank discs defining a centre of rotation and having respective drive gears connecting them to the main driven shaft, said crank discs defining a clear space between them;

crank disc shafts extending outwardly from said crank discs;

two driven gears on said main drive shaft coupled to respective said drive gears;

an elongated slot formed in each said crank disc;

two ends on said crank pin, extending on respective sides of said connecting rod respective said ends being received in respective said slots in respective said crank discs whereby said connecting rod can reciprocate in said clear space between said crank discs;

side plates on opposite sides of said crank discs;

crank disc shaft bearings on the exterior of said side plates for supporting said crank discs shafts.

8. A gear crank mechanism as claimed in claim 7 and including grooves formed in said side plates for receiving respective ends of said crank pin, said grooves defining circular orbit paths for said ends of said crank pin;

rings formed on respective crank discs;

recesses formed in respective side plates, for receiving respective rings, said recesses being located spaced radially outwardly with respect to said grooves.

* * * * *